United States Patent Office 3,204,934
Patented Sept. 7, 1965

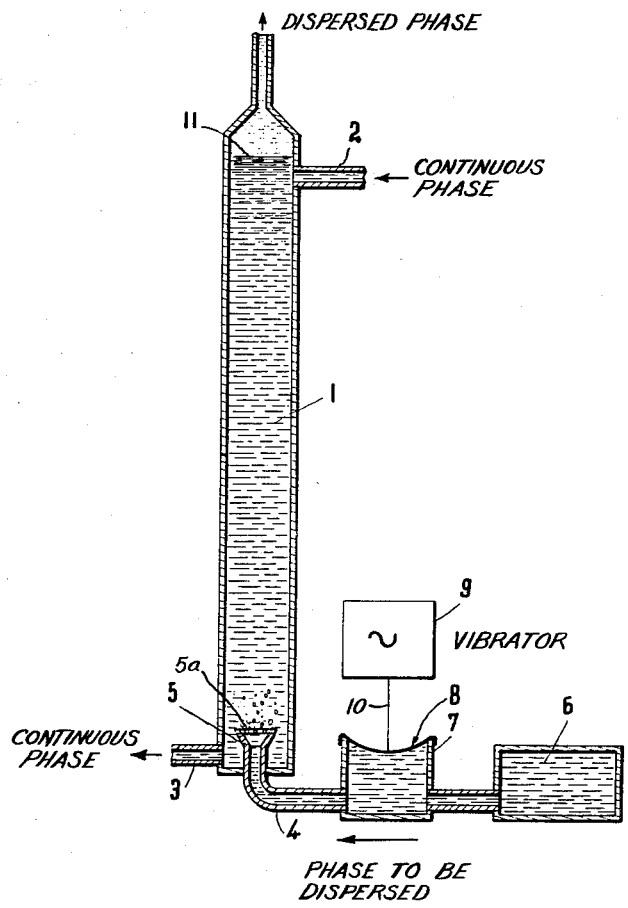

3,204,934
PROCESS FOR THE DISPERSION OF UNIFORM DROPLETS OF A LIQUID IN A SECOND LIQUID
Geoffroy Graham, Grenoble, Jacques Hure, Fontenay-aux-Roses, and Rose Saint-James, Paris, France, assignors to Commissariat a l'Energie Atomique, Paris, France
Filed Apr. 29, 1963, Ser. No. 276,414
Claims priority, application France, May 9, 1962, 896,913
3 Claims. (Cl. 259—4)

The present invention relates to a process for the dispersion of uniform droplets of a liquid in a second liquid.

It is found necessary in columns for liquid-liquid processing between two immiscible or partially miscible phases to carry out processes of heat transfer, mass transfer and even chemical reactions which can in certain cases bring about a modification of the nature of the dispersed liquid phase, for example as a result of gasification or solidification accompanied by change of molecular weight.

It is known that the coefficients of mass transfer or heat transfer depend on the one hand on the size of the droplets of the dispersed phase and, on the other hand, on the dynamic conditions to which the droplets are subjected as compared with the continuous phase and which can be characterized by the relative velocity of the droplets and the continuous phase.

The transfer processes are also directly dependent on the size of the droplets and more especially on the interface area.

Moreover, since processing columns are usually of the countercurrent flow type, the maximum throughput of the continuous phase is limited by the velocity of natural downward motion or upward motion of the smallest droplet which is in relative motion in the coulmn; in fact, beyond this maximum throughput, there is a retention of the smallest droplets in the column and resulting stoppage in the processing of these latter.

In the case of an uneven size distribution, the throughput is limited in the higher values by the rate of fluidization of the smallest droplet which is located in the column. The result thereby achieved is that the large droplets move very quickly and their hold-up time is short.

The main object of the present invention is to overcome the disadvantages cited above by permitting the operation of a plant under optimum processing conditions, that is to say maximum throughput of a column having a given diameter and maximum efficiency.

The invention is characterized in that there are formed in a liquid uniform droplets of controlled diameter of a second liquid to be dispersed by application of a vibration to said second liquid, the volume of each droplet thus obtained being equal to the quotient of the rate of flow of the second liquid through each opening of an injector which generates the dispersion by the frequency of the vibration applied.

In accordance with the invention, the said vibration can be carried into effect by either lateral or longitudinal vibration of the injector, or by vibration of the liquid to be dispersed, as effected on the upstream side of said injector.

The liquid in which the dispersion is carried out can either have a zero flow motion or a continuous flow motion, or alternatively a pulsed flow having both a frequency and amplitude which are not liable to interfere with the vibrational process.

The process in accordance with the invention is of considerable interest in liquid-liquid transfer processes, for example in solvent extraction columns in which the dispersed phase remains in the liquid state during processing. It is thus possible to adjust the diameter of the droplets (the uniformity of which is ensured) to the optimum value from the viewpoint of the extraction efficiency and the maximum extraction rate.

This optimum diameter must, for example, be sufficiently small to provide a substantial surface area for the exchange of droplets yet at the same time sufficiently large to permit the existence of circulation currents within the droplets.

This process is advantageous in other cases, for example in which it is desired to produce uniform droplets for the purpose of transforming them as a result of a later process either into gas bubbles or solid particles.

Such is the case in particular in the manufacture by polymerization of grains of plastic material or ion exchange resins, or in the manufacture by precipitation, reaction or coating of lyes or fertilizers. In fact the process in accordance with the invention serves to obtain spherical grains of solid products with a predetermined size distribution.

One non-limitative form of embodiment will now be described below with reference to the accompanying figure which illustrates diagrammatically a liquid-liquid extraction column designed to operate in accordance with the process which forms the subject matter of the present invention.

The extraction column is designated by the reference 1, the continuous phase being fed in at 2 and withdrawn at 3 while the phase to be dispersed is fed into the base of the column through a pipe 4 and through an injector nozzle 5 which is provided with a certain number of openings 5a.

An interface between continuous phase and dispersed phase is formed at 11.

The phase to be dispersed is supplied from a pressure tank 6 and, in accordance with the invention, the external vibration which is applied to the dispersed phase for the purpose of forming uniform droplets is carried into effect by interposing in the dispersed-phase inlet pipe 4 a closed vessel 7 fitted with a diaphrgam 8 which is connected to a variable-frequency vibrator 9 by means of a rod 10.

The diaphragm 8 is thus caused to vibrate at the desired frequency, the result thereby produced being the formation of unifom droplets of dispersed phase at the outlet of the injector 5, the volume of each droplet being equal to the quotient of the flow through each opening of the injector by the vibrational frequency.

It can be disclosed by way of example that, if a column of this type is fed with isobutanol at a rate of 2 liters per hour through an injector 5 comprising 16 nozzles each 0.5 mm. in diameter so as to disperse said isobutanol into a continuous phase consisting of water which is fed at a rate of 10 liters per hour through the pipe 2 and withdrawn through the pipe 3, and if the vibrator 9 is caused to vibrate at a frequency of 53 cycles per second, there are accordingly obtained homogeneous droplets each 1 millimeter in diameter, the height of transfer unit (HTU) being in this case 98 centimeters.

When operating under the same conditions but without vibration of the liquid to be dispersed, a height of unit transfer of 173 centimeters is obtained.

It will be understood that the invention is not limited to the mode of practical operation which has been described and illustrated but is intended on the contrary to include within its scope all alternative forms which fall within the spirit of this invention as defined in the appended claims.

What we claim is:
1. A process for the dispersion of uniform droplets of a first liquid in a column of a second liquid, comprising: feeding said second liquid into said column adjacent one end thereof at a preselected fixed rate; withdrawing said second liquid from adjacent the other end of said column at said preselected rate; dispersing said first liquid into said column of said second liquid at a predetermined fixed rate adjacent said other end of said column through a plurality of openings of uniform size formed in an injector while applying vibrations directly only to said first liquid at a constant, predetermined frequency prior to its dispersion into said column to form in said second liquid homogeneous droplets of said first liquid of a controlled, uniform diameter, and withdrawing said droplets of said first liquid from said column adjacent said one end thereof.

2. A process in accordance with claim 1 in which the vibrations applied are vibrations of the injector.

3. A process in accordance with claim 1, in which the vibrations applied are vibrations of the first liquid as effected on the upstream side of said injector.

References Cited by the Examiner

UNITED STATES PATENTS

| | | | |
|---|---|---|---|
| 2,090,496 | 8/37 | Wynn | 259—95 |
| 2,512,743 | 6/50 | Hansell. | |
| 2,714,186 | 7/55 | Henrich. | |
| 2,988,429 | 6/61 | Cooley | 23—270.5 |

OTHER REFERENCES

Thornton: Recent Developments in Pulsed-Column Techniques, in Chem. Eng. Progress 50 (13) pp. 39–52, May 1957, Class 23, subclass 310 (Group 180). Copy in Scientific Library, Patent Office.

WALTER A. SCHEEL, *Primary Examiner.*